United States Patent
Ishida

(10) Patent No.: US 8,397,775 B2
(45) Date of Patent: Mar. 19, 2013

(54) CUSHIONING RUBBER COMPOSITION AND PNEUMATIC TIRE EMPLOYING THE SAME

(75) Inventor: Hirokazu Ishida, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 483 days.

(21) Appl. No.: 12/637,441

(22) Filed: Dec. 14, 2009

(65) Prior Publication Data

US 2010/0163151 A1 Jul. 1, 2010

(30) Foreign Application Priority Data

Dec. 26, 2008 (JP) ................................. 2008-334239

(51) Int. Cl.
*B60C 5/00* (2006.01)
(52) U.S. Cl. .................... 152/454; 152/537; 524/495
(58) Field of Classification Search ............... 524/495; 152/454, 537
See application file for complete search history.

(56) References Cited

U.S. PATENT DOCUMENTS

| | | | |
|---|---|---|---|
| 5,696,197 A * | 12/1997 | Smith et al. | 524/495 |
| 2006/0217481 A1 | 9/2006 | Otsuki | |
| 2007/0093580 A1 * | 4/2007 | Mizuno | 524/495 |

FOREIGN PATENT DOCUMENTS

| | | |
|---|---|---|
| JP | 2000-71716 A | 3/2000 |
| JP | 2000-177316 A | 6/2000 |
| JP | 2002-105248 A | 4/2002 |
| JP | 2004-99804 A | 4/2004 |
| JP | 2004-161862 A | 6/2004 |
| JP | 2004-189772 A | 7/2004 |
| JP | 2005-67358 A | 3/2005 |
| JP | 2006-124504 A | 5/2006 |
| JP | 2006-273934 A | 10/2006 |

OTHER PUBLICATIONS

Office Action dated Nov. 16, 2010 for Japanese Application No. 2008-334239.

* cited by examiner

*Primary Examiner* — Ling Choi
*Assistant Examiner* — Wenwen Cai
(74) *Attorney, Agent, or Firm* — Birch, Stewart, Kolasch & Birch, LLP

(57) ABSTRACT

A cushioning rubber composition contains 5 to 20 parts by mass of first carbon black having an iodine adsorption number of 50 to 70 mg/g and a dibutyl phthalate oil absorption of 130 to 150 ml/100 g and 15 to 30 parts by mass of second carbon black having an iodine adsorption number of 110 to 130 mg/g and a dibutyl phthalate oil absorption of 105 to 120 ml/100 g as well as sulfur and a vulcanization accelerator with respect to 100 parts by mass of a rubber component, while the mass ratio of sulfur to the vulcanization accelerator is 1.0 to 2.3.

2 Claims, 1 Drawing Sheet

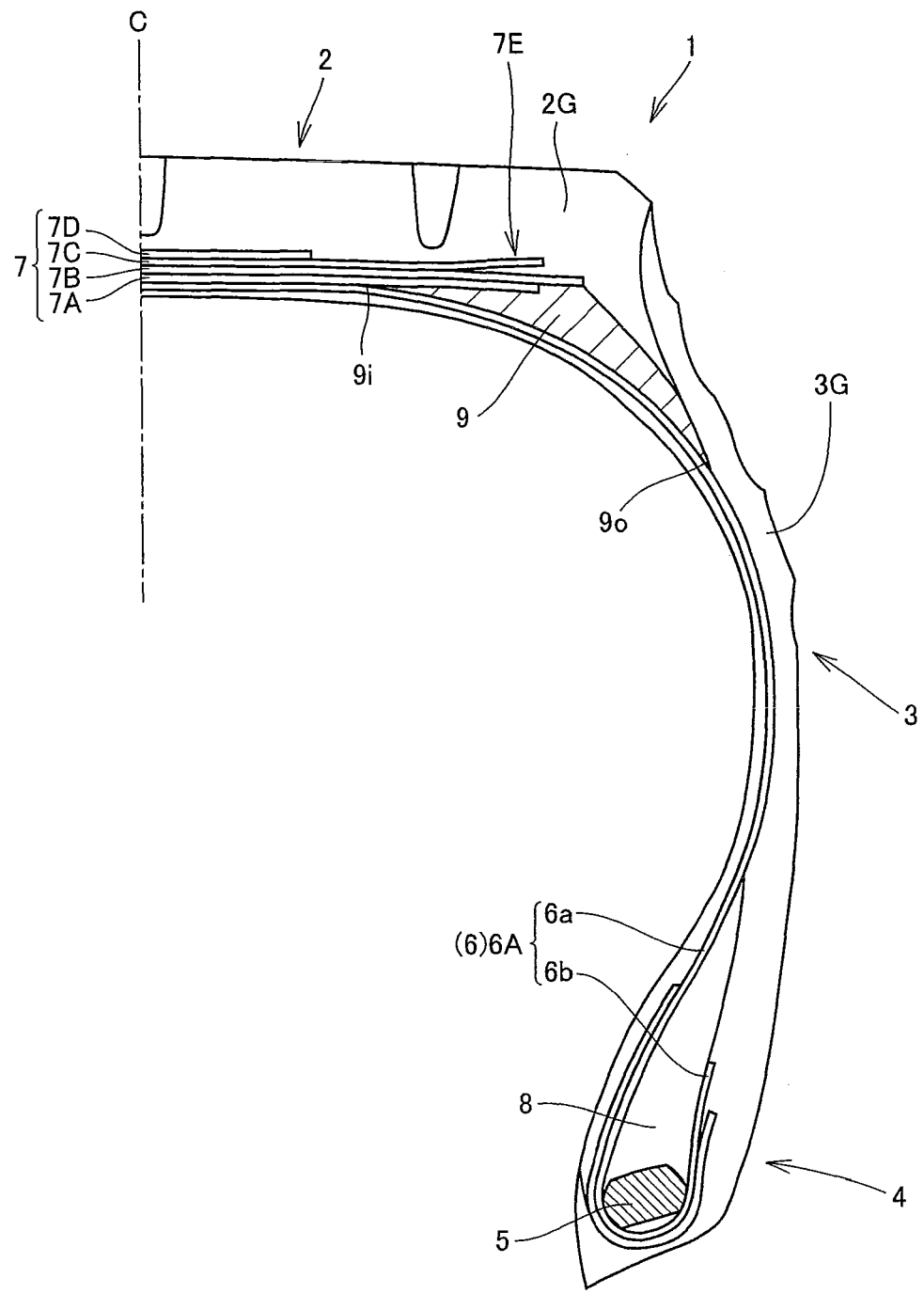

CUSHIONING RUBBER COMPOSITION AND PNEUMATIC TIRE EMPLOYING THE SAME

This nonprovisional application is based on Japanese Patent Application No. 2008-334239 filed on Dec. 26, 2008 with the Japan Patent Office, the entire contents of which are hereby incorporated by reference.

BACKGROUND OF THE INVENTION

1. Field of the Invention

The present invention relates to a cushioning rubber composition and a pneumatic tire.

2. Description of the Background Art

Global warming has recently continued due to the emission of carbon dioxide, and emissions of exhaust gas and carbon dioxide from motor vehicles are now being strictly regulated. Further, it is anticipated that light oil such as gasoline or diesel oil for motor vehicles obtained from petroleum resources is depleted in the future.

Therefore, lower fuel consumption is increasingly required to a motor vehicle such as a truck or a bus, and development of a tire having small rolling resistance (small fuel consumption) is regarded as important.

The rolling resistance of a tire can be effectively reduced by modifying a tread occupying the maximum mass among tire members, and has generally been reduced by modifying the tread. However, the tread is a tire member most influencing wear resistance and gripping performance of the tire, and hence reduction of the rolling resistance along with maintenance of the wear resistance and the gripping performance is technically reaching the limit.

Therefore, it is hereafter important to reduce the rolling resistance of the tire by modifying a tire member other than the tread.

A breaker cushion can be listed as the tire member to be modified for enabling reduction of the rolling resistance without influencing the wear resistance and the gripping performance of the tire. The breaker cushion, denoting a tire member 9 arranged between a carcass 6 and an end of a belt layer 7 in the axial direction of a tire shown in FIG. 1, is an important tire member remarkably influencing durability of the tire and the comfortableness of the motor vehicle.

In order to modify the breaker cushion, the loss tangent tan δ of a cushioning rubber composition is reduced by increasing the abundance ratio of a rubber component in the rubber composition thereby reducing the abundance ratio of a reinforcing filler such as carbon black, for example. In this case, however, the rubber composition is not sufficiently reinforced but the complex Young's modulus E* thereof is reduced, and hence the breaker cushion is easily deformed to increase energy loss. According to this method, therefore, the rolling resistance of the tire cannot be reduced.

According to another method, the loss tangent tan δ of the rubber composition is reduced by adding a large quantity of vulcanizer to the cushioning rubber composition. In this case, the rolling resistance can be reduced without reducing the abundance ratio of the reinforcing filler in the rubber composition. However, the physical properties of the rubber composition are remarkably changed by heat aging resulting from hard use of the tire, and the tire has insufficient resistance (breakage resistance) for withstanding an impact against the side surface of the tire upon running up onto a curbstone or traveling on an irregular ground when the rubber composition is employed as the material for the breaker cushion.

The level of the breakage resistance required to the tire varies with the type of the tire, and a radial tire employed for a vehicle such as a heavy-duty truck or a bus receiving a heavier load than a small truck requires superior breakage resistance.

Japanese Patent Laying-Open No. 2004-099804 describes a rubber composition for a tire containing carbon black having a nitrogen adsorption specific surface area of 30 to 70 $m^2/g$, a dibutyl phthalate oil absorption of at least 134 $cm^3$/100 g and an iodine adsorption number of 20 to 50 mg/g as a rubber composition for a tire excellent in balance between reinforcing property and low rolling resistance (LRR).

Japanese Patent Laying-Open No. 2000-71716 describes a technique of arranging a reinforcing rubber layer between a belt ply and a carcass and setting the reinforcing rubber layer to prescribed physical properties in order to reduce fuel consumption of a vehicle by reducing the mass of a tire while keeping strength of the tire.

However, further improvement of performance is required to each technique.

SUMMARY OF THE INVENTION

An object of the present invention is to provide a cushioning rubber composition and a pneumatic tire improved in low fuel consumption performance while keeping strength.

The present invention provides a cushioning rubber composition containing 5 to 20 parts by mass of first carbon black having an iodine adsorption number of 50 to 70 mg/g and a dibutyl phthalate oil absorption of 130 to 150 ml/100 g and 15 to 30 parts by mass of second carbon black having an iodine adsorption number of 110 to 130 mg/g and a dibutyl phthalate oil absorption of 105 to 120 ml/100 g as well as sulfur and a vulcanization accelerator with respect to 100 parts by mass of a rubber component, while the mass ratio of sulfur to the vulcanization accelerator is 1.0 to 2.3.

The present invention also provides a pneumatic tire employing the cushioning rubber composition.

According to the present invention, a cushioning rubber composition and a pneumatic tire improved in low fuel consumption performance while keeping strength can be obtained.

The foregoing and other objects, features, aspects and advantages of the present invention will become more apparent from the following detailed description of the present invention when taken in conjunction with the accompanying drawing.

BRIEF DESCRIPTION OF THE DRAWING

FIG. 1 is a sectional view showing the right half of a pneumatic tire according to the present invention.

DESCRIPTION OF THE PREFERRED EMBODIMENT

Structure of Pneumatic Tire

A pneumatic tire 1 according to an embodiment of the present invention is described with reference to FIG. 1.

FIG. 1 is a sectional view showing the right half of pneumatic tire 1 for a heavy load used for a truck or a bus. Pneumatic tire 1 is provided with a tread portion 2, a pair of sidewall portions 3 inwardly extending from both ends thereof in the radial direction of tire 1 and a bead portion 4 positioned on an inner end of each sidewall portion 3. Pneumatic tire 1 is further provided with a toroidal carcass 6 extending between bead portions 4 and a belt layer 7 arranged on the outer side of carcass 6.

Carcass 6 is constituted of a carcass ply 6A having a body portion 6a reaching a bead core 5 of bead portion 4 from tread portion 2 through sidewall portion 3 and a folded portion 6b continuous to body portion 6a and folded around bead core 5 from the inner side toward the outer side in the axial direction of tire 1 according to this embodiment. A bead apex 8 taperingly extending from bead core 5 outward in the radial direction of tire 1 is provided between body portion 6a and folded portion 6b, to properly reinforce bead portion 4.

Belt layer 7 is constituted of at least two, i.e. four belt plies 7A, 7B, 7C and 7D according to this embodiment. Belt plies 7A to 7D are arranged in a state inclining parallelly arranged steel cords with respect to a tire equator C.

Tread rubber 2G is arranged on the outer side of belt layer 6 in the radial direction of tire 1. Pneumatic tire 1 has the so-called SOT (Sidewall Over Tread) structure, and both ends of tread rubber 2G in the axial direction of tire 1 are covered with sidewall rubber 3G. However, pneumatic tire 1 is not particularly restricted to this mode.

Cushion rubber 9 having a substantially triangular section is arranged between carcass 6 and an end 7E of belt layer 7 in the axial direction of tire 1. Cushion rubber 9 has an inner end 9i and an outer end 9o in the axial direction of tire 1, and extends therebetween. Cushion rubber 9 fills up the space between end 7E of belt layer 7 and carcass 6, to disperse strain by following deformation of end 7E of belt layer 7 in loaded traveling. Rubber compounding of cushion rubber 9 is so properly controlled that excess heat generation resulting from periodic deformation can be prevented. The cushioning rubber composition according to the present invention is used for cushion rubber 9.

<Cushioning Rubber Composition>

The cushioning rubber composition according to the present invention contains a rubber component and specific carbon black as well as sulfur and a vulcanization accelerator in prescribed compounding ratios.

(Rubber Component)

Generally used natural rubber (NR), diene rubber such as styrene-butadiene rubber (SBR) or butadiene rubber (BR) or butyl rubber such as isobutylene-isoprene rubber (IIR) or chlorinated isobutylene-isoprene rubber (X-IIR) is used as the rubber component. In particular, diene rubber is preferably used, and natural rubber is more preferably used, so that high strength and a low exothermic property can be supplied to the tire.

(Carbon Black)

The cushioning rubber composition according to the present invention contains first carbon black having an iodine adsorption number of 50 to 70 mg/g and a dibutyl phthalate oil absorption of 130 to 150 ml/100 g and second carbon black having an iodine adsorption number of 110 to 130 mg/g and a dibutyl phthalate oil absorption of 105 to 120 ml/100 g.

The iodine adsorption number of the first carbon black is at least 50 mg/g. If the iodine adsorption number of the first carbon black is less than 50 mg/g, target breakage resistance cannot be obtained. Further, the iodine adsorption number of the first carbon black is not more than 70 mg/g. If the iodine adsorption number of the first carbon black exceeds 70 mg/g, the loss tangent tan δ of the cushioning rubber composition is so increased that target low fuel consumption cannot be obtained. The iodine adsorption number of the first carbon black is more preferably 52 to 65 mg/g.

The dibutyl phthalate oil absorption (DBP oil absorption) of the first carbon black is at least 130 ml/100 g. If the DBP oil absorption of the first carbon black is less than 130 ml/100 g, the loss tangent tan δ of the cushioning rubber composition is so increased that the target low fuel consumption cannot be obtained. Further, the DBP oil absorption of the first carbon black is not more than 150 ml/100 g. If the DBP oil absorption of the first carbon black exceeds 150 ml/100 g, the breakage resistance cannot be obtained. The DBP oil absorption of the first carbon black is more preferably 130 to 145 ml/100 g.

The content of the first carbon black is at least 5 parts by mass with respect to 100 parts by mass of the rubber component. If the content of the first carbon black is less than 5 parts by mass, reinforcement with the first carbon black is so insufficient that the target breakage resistance cannot be obtained. Further, the content of the first carbon black is not more than 20 parts by mass with respect to 100 parts by mass of the rubber component. If the content of the first carbon black exceeds 20 parts by mass, the loss tangent tan δ of the cushioning rubber composition is so increased that the target low fuel consumption cannot be obtained. The content of the first carbon black is more preferably 10 to 20 parts by mass with respect to 100 parts by mass of the rubber component.

The iodine adsorption number of the second carbon black is at least 110 mg/g. If the iodine adsorption number of the second carbon black is less than 110 mg/g, the target breakage resistance cannot be obtained. Further, the iodine adsorption number of the second carbon black is not more than 130 mg/g. If the iodine adsorption number of the second carbon black exceeds 130 mg/g, the loss tangent tan δ of the cushioning rubber composition is so increased that the target low fuel consumption cannot be obtained. The iodine adsorption number of the second carbon black is more preferably 118 to 120 mg/g.

The dibutyl phthalate oil absorption (DBP oil absorption) of the second carbon black is at least 105 ml/100 g. If the DBP oil absorption of the second carbon black is less than 105 ml/100 g, the loss tangent tan δ of the cushioning rubber composition is so increased that the target low fuel consumption cannot be obtained. Further, the DBP oil absorption of the second carbon black is not more than 120 ml/100 g. If the DBP oil absorption of the second carbon black exceeds 120 ml/100 g, the target breakage resistance cannot be obtained. The DBP oil absorption of the second carbon black is more preferably 110 to 118 ml/100 g.

The content of the second carbon black is at least 15 parts by mass with respect to 100 parts by mass of the rubber component. If the content of the second carbon black is less than 15 parts by mass, reinforcement with the second carbon black is so insufficient that the target breakage resistance cannot be obtained. Further, the content of the second carbon black is not more than 30 parts by mass with respect to 100 parts by mass of the rubber component. If the content of the second carbon black exceeds 30 parts by mass, the loss tangent tan δ of the cushioning rubber composition is so increased that the target low fuel consumption cannot be obtained. The content of the second carbon black is more preferably 20 to 25 parts by mass with respect to 100 parts by mass of the rubber component.

(Sulfur)

While sulfur generally employed in vulcanization in the rubber industry can be employed, insoluble sulfur is preferably employed in particular. Insoluble sulfur denotes sulfur prepared by heating and quenching natural sulfur S8 and thereafter increasing the molecular weight thereof to be Sx (x: 100,000 to 300,000). Insoluble sulfur is so employed as to prevent blooming generally caused when sulfur is employed as a rubber vulcanizer.

The loading of sulfur (pure sulfur excluding oil) is preferably 2 to 4 parts by mass with respect to 100 parts by mass of the rubber component. There is such a tendency that the loss tangent tan δ of the cushioning rubber composition is so increased that the target low fuel consumption cannot be obtained if the loading of sulfur is less than 2 parts by mass, while there is such a tendency that heat aging resistance of the rubber composition is so deteriorated that the target breakage resistance cannot be obtained if the loading of sulfur exceeds 4 parts by mass.

(Vulcanization Accelerator)

A vulcanization accelerator containing at least one of sulfenamide-based, thiazole-based, thiuram-based, thiourea-based, guanidine-based, dithiocarbamate-based, aldehyde-amine-based or aldehyde-ammonia-based, imidazoline-based and xanthate-based vulcanization accelerators can be used.

As the sulfenamide-based vulcanization accelerator, a sulfenamide-based compound such as CBS (N-cyclohexyl-2-benzothiazyl sulfenamide), TBBS (N-t-butyl-2-benzothiazyl sulfenamide), N,N-dicyclohexyl-2-benzothiazyl sulfenamide, N-oxydiethylene-2-benzothiazyl sulfenamide or N,N-diisopropyl-2-benzothiazole sulfenamide can be listed, for example.

As the thiazole-based vulcanization accelerator, MBT (2-mercaptobenzothiazole), MBTS (dibenzothiazyl disulfide), sodium salt, zinc salt, copper salt or cyclohexylamine salt of 2-mercaptobenzothiazole, 2-(2,4-dinitrophenyl)mercaptobenzothiazole or 2-(2,6-diethyl-4-morpholinothio)benzothiazole can be listed, for example.

As the thiuram-based vulcanization accelerator, TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide or pentamethylenethiuram tetrasulfide can be listed, for example.

As the thiourea-based vulcanization accelerator, a thiourea compound such as thiacarbamide, diethylthiourea, dibutylthiourea, trimethylthiourea or diorthotolylthiourea can be listed, for example.

As the guanidine-based vulcanization accelerator, a guanidine-based compound such as diphenylguanidine, diorthotolylguanidine, triphenylguanidine, orthotolylbiguanide or diphenylguanidine phthalate can be listed, for example.

As the dithiocarbamate-based vulcanization accelerator, zinc ethylphenyl dithiocarbamate, zinc butylphenyl dithiocarbamate, sodium dimethyldithiocarbamate, zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine or zinc hexadecyl (or octadecyl) isopropyldithiocarbamate can be listed, for example.

As the aldehyde-amine-based or aldehyde-ammonia-based vulcanization accelerator, an acetaldehyde-aniline reactant, a butylaldehyde-aniline condensate, hexamethylene tetramine or an acetaldehyde-ammonia reactant can be listed, for example.

When sulfur is mixed into the cushioning rubber composition by the aforementioned quantity as the vulcanizer, the vulcanization accelerator is compounded in the range of 1.0 to 2.3 in the mass ratio of sulfur to the vulcanization accelerator. The vulcanization accelerator is more preferably added in the range of 1.6 to 2.1 in the mass ratio of sulfur to the vulcanization accelerator.

(Vulcanization Assistant)

Stearic acid or zinc oxide (zinc white) can be used as a vulcanization assistant.

(Antioxidant)

An amine-based, phenol-based or imidazole-based compound, metallic salt of carbamate or wax can be properly selected and used as an antioxidant.

(Other Compounding Agents)

In addition to the rubber component, carbon black, sulfur and the vulcanization accelerator, a crosslinking agent, a filler, a softener, a plasticizer, a coupling agent etc. generally used in the tire industry can be mixed into the cushioning rubber composition.

<Method of Preparing Cushioning Rubber Composition>

The rubber composition according to the present invention can be prepared by a method well known in the art such as a method of weighing the aforementioned materials in prescribed compounding ratios and thereafter kneading the same in a rubber kneader such as an open roll mill or a Banbury mixer at a temperature of 100 to 250° C. for 5 to 60 minutes, for example.

<Method of Manufacturing Pneumatic Tire>

The pneumatic tire according to the present invention can be manufactured by treating an unvulcanized tire obtained by molding the cushioning rubber composition into the shape of a breaker cushion in an unvulcanized stage and bonding the breaker cushion to other tire members at a vulcanization temperature of 140 to 160° C. for a vulcanization time of 30 to 50 minutes.

<Pneumatic Tire>

The pneumatic tire according to the present invention is preferably mounted on a heavy-duty vehicle. As the heavy-duty vehicle, a small truck, a heavy-duty truck, a bus or an aircraft can be listed, for example. In particular, the pneumatic tire according to the present invention is preferably mounted on a heavy-duty truck mainly traveling at a high speed, so that the same can easily exhibit the effect of low fuel consumption.

Examples 1 to 5 and Comparative Examples 1 to 5

Preparation of Cushioning Rubber Composition

A kneaded substance was obtained by kneading chemicals other than sulfur and a vulcanization accelerator in a Banbury mixer at 160° C. for 5 minutes according to each of compounding prescriptions shown in Table 1. Then, an unvulcanized cushioning rubber composition was obtained by adding sulfur and the vulcanization accelerator to the obtained kneaded substance and kneading the mixture in an open roll mill at 100° C. for 5 minutes. A vulcanized cushioning rubber composition according to each of Examples 1 to 5 and comparative examples 1 to 5 was obtained by press-vulcanizing the unvulcanized cushioning rubber composition at 150° C. for 30 minutes. The obtained vulcanized cushioning rubber composition was subjected to measurement of the following items:

<Hardness>

Rubber hardness of the vulcanized cushioning rubber composition was measured with a type A durometer according to JIS K 6253 "Hardness Test Method for Vulcanized Rubber and Thermoplastic Rubber".

<Breakage Resistance>

The vulcanized cushioning rubber composition according to each of Examples 1 to 5 and comparative examples 1 to 5 was heat-aged with a gear oven heat aging tester (by Toyo Seiki Co., Ltd.) at 80° C. for seven days. A dumbbell No. 3 specimen was cut out of a sheet of the heat-aged cushioning rubber composition and subjected to a tensile test according to JIS K 6251, to measure tensile break strength TB (MPa)

and elongation at breakage EB (%). Breakage resistance of the specimen was calculated from the tensile break strength TB (MPa) and the elongation at breakage EB (%) as follows:

(Breakage resistance)=(tensile break strength TB)×(elongation at breakage EB)×0.5

Table 1 indexes the breakage resistance of the specimen according to each of Examples 2 to 5 and comparative examples 1 to 5 with reference to the breakage resistance (100) of Example 1. The breakage resistance is improved as the following breakage resistance index is increased:

(Breakage resistance index)=(breakage resistance of each specimen)÷(breakage resistance of specimen according to Example 1)×100

<Exothermic Property>

The loss tangent tan δ of each vulcanized cushioning rubber composition at a temperature of 70° C. was measured with a viscoelastic spectrometer by Iwamoto Quartz GlassLab Co., Ltd. under conditions of initial strain of 10%, kinetic strain of 2% and a frequency of 10 Hz. Table 1 indexes the loss tangent tan δ of each vulcanized cushioning rubber composition with reference to the loss tangent tan δ (100) of the vulcanized cushioning rubber composition according to Example 1. Rolling resistance is reduced and exothermic property is improved as the following exothermic property index is reduced:

(Exothermic property index)=(loss tangent tan δ of vulcanized cushioning rubber composition)÷(exothermic property of Example 1)×100

Table 1 shows the results of the measurement.

Antioxidant RD: Nocrack 224 by Ouchi Shinko Chemical Industrial

Sulfur: 5% oil-treated sulfur by Tsurumi Chemical Co., Ltd.

Vulcanization accelerator: Nocceler NS-P by Ouchi Shinko Chemical Industrial

<Results of Evaluation>

The vulcanized cushioning rubber composition according to Example 1 contains 5 parts by mass of the first carbon black, 30 parts by mass of the second carbon black, 2.7 parts by mass of sulfur and 1.3 parts by mass of the vulcanization accelerator (the ratio of sulfur to the vulcanization accelerator is 2.1) with respect to 100 parts by mass of NR. The vulcanized cushioning rubber compositions according to Examples 2 to 5 and comparative examples 1 to 5 are now evaluated with reference to the vulcanized cushioning rubber composition according to Example 1.

The vulcanized cushioning rubber composition according to each of Examples 2 to 4 contains 10 to 20 parts by mass of the first carbon black, 20 to 25 parts by mass of the second carbon black, 2.7 parts by mass of sulfur and 1.3 parts by mass of the vulcanization accelerator (the ratio of sulfur to the vulcanization accelerator is 2.1) with respect to 100 parts by mass of NR. The vulcanized cushioning rubber composition was improved in both of breakage resistance and exothermic property as compared with Example 1.

The vulcanized cushioning rubber composition according to Example 5 contains 10 parts by mass of the first carbon black, 25 parts by mass of the second carbon black, 2.7 parts by mass of sulfur and 1.7 parts by mass of the vulcanization

|  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Loading (parts by mass) | NR | 100 | 100 | 100 | 100 | 100 | 100 | 100 | 100 | 100 | 100 |
|  | Carbon Black N220 | 30 | 25 | 25 | 20 | 25 | 30 | 15 | 50 | 25 | 30 |
|  | Carbon Black N351H | 5 | 10 | 15 | 20 | 10 | 0 | 0 | 0 | 10 | 0 |
|  | Zinc Oxide | 3 | 3 | 3 | 3 | 3 | 3 | 3 | 3 | 3 | 3 |
|  | Stearic Acid | 2 | 2 | 2 | 2 | 2 | 2 | 2 | 2 | 2 | 2 |
|  | Antioxidant 6C | 1 | 1 | 1 | 1 | 1 | 1 | 1 | 1 | 1 | 1 |
|  | Antioxidant RD | 2 | 2 | 2 | 2 | 2 | 2 | 2 | 2 | 2 | 2 |
|  | Sulfur | 2.7 | 2.7 | 2.7 | 2.7 | 2.7 | 3.5 | 3.5 | 3.5 | 3.5 | 2.1 |
|  | Vulcanization Accelerator | 1.3 | 1.3 | 1.3 | 1.3 | 1.7 | 0.9 | 0.9 | 0.9 | 0.9 | 1.7 |
|  | Ratio of Sulfur to Vulcanization Accelerator | 2.1 | 2.1 | 2.1 | 2.1 | 1.2 | 3.9 | 3.9 | 3.9 | 3.9 | 1.2 |
| Evaluation | Hardness | 57 | 59 | 59 | 58 | 57 | 56 | 51 | 65 | 57 | 57 |
|  | Breakage Resistance Index | 100 | 106 | 103 | 103 | 117 | 77 | 83 | 86 | 71 | 89 |
|  | Exothermic Property Index | 100 | 99 | 98 | 96 | 99 | 100 | 86 | 357 | 99 | 100 |

NR: STR20

First carbon black: Diablack N351H (iodine adsorption number: 57 mg/g, dibutyl phthalate oil absorption: 136 ml/100 g) by Mitsubishi Chemical Corporation Second carbon black (N220): Diablack I (iodine adsorption number: 118 mg/g, dibutyl phthalate oil absorption: 114 ml/100 g) by Mitsubishi Chemical Corporation Zinc oxide: two types of zinc oxide by Mitsui Mining and Smelting Co., Ltd.

Stearic acid: stearic acid "Tsubaki" by Nippon Oil and Fats Co., Ltd.

Antioxidant 6C: Santoflex 6PPD by Flexys Limited accelerator (the ratio of sulfur to the vulcanization accelerator is 1.2) with respect to 100 parts by mass of NR. The vulcanized cushioning rubber composition was remarkably improved in breakage resistance and in exothermic property as compared with Example 1.

The vulcanized cushioning rubber composition according to each of comparative examples 1 and 2 contains 30 or 15 parts by mass of the second carbon black, 3.5 parts by mass of sulfur and 0.9 parts by mass of the vulcanization accelerator (the ratio of sulfur to the vulcanization accelerator is 3.9) with respect to 100 parts by mass of NR, and contains no first carbon black. The vulcanized cushioning rubber composition was remarkably deteriorated in breakage resistance and equivalent in exothermic property as compared with Example 1.

The vulcanized cushioning rubber composition according to comparative example 3 contains 50 parts by mass of the second carbon black, 3.5 parts by mass of sulfur and 0.9 parts by mass of the vulcanization accelerator (the ratio of sulfur to the vulcanization accelerator is 3.9) with respect to 100 parts by mass of NR, and contains no first carbon black. The vulcanized cushioning rubber composition was remarkably deteriorated in breakage resistance and in exothermic property as compared with Example 1.

The vulcanized cushioning rubber composition according to comparative example 4 contains 10 parts by mass of the first carbon black, 25 parts by mass of the second carbon black, 3.5 parts by mass of sulfur and 0.9 parts by mass of the vulcanization accelerator (the ratio of sulfur to the vulcanization accelerator is 3.9) with respect to 100 parts by mass of NR. The vulcanized cushioning rubber composition was remarkably deteriorated in breakage resistance and equivalent in exothermic property as compared with Example 1.

The vulcanized cushioning rubber composition according to comparative example 5 contains 30 parts by mass of the second carbon black, 2.1 parts by mass of sulfur and 1.7 parts by mass of the vulcanization accelerator (the ratio of sulfur to the vulcanization accelerator is 1.2) with respect to 100 parts by mass of NR, and contains no first carbon black. The vulcanized cushioning rubber composition was remarkably deteriorated in breakage resistance and equivalent in exothermic property as compared with Example 1.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A pneumatic tire which comprises:
   a tread portion,
   a pair of side wall portions,
   a carcass extending through the tread portion and into said side wall portions,
   a belt layer extending through the tread and disposed on the outer side of the carcass, and
   a cushion having a substantially triangular section disposed between the carcass and end portions of the belt layer at both sides of the tread portion and in the axial direction of the tire, said cushion consists essentially of,
   5 to 20 parts by mass of a first carbon black having an iodine adsorption number of 50 to 70 mg/g and a dibutyl phthalate oil absorption of 130 to 150 ml/100 g and
   15 to 30 parts by mass of a second carbon black having an iodine adsorption number of 110 to 130 mg/g and a dibutyl phthalate oil absorption of 105 to 120 ml/100 g, as well as sulfur and a vulcanization accelerator, with respect to 100 parts by mass of a rubber component, wherein
   the mass ratio of sulfur to said vulcanization accelerator is 1.0 to 2.3.
2. A rubber cushion consists essentially of:
   5 to 20 parts by mass of a first carbon black having an iodine adsorption number of 50 to 70 mg/g and a dibutyl phthalate oil absorption of 130 to 150 ml/100 g and
   15 to 30 parts by mass of a second carbon black having an iodine adsorption number of 110 to 130 mg/g and a dibutyl phthalate oil absorption of 105 to 120 ml/100 g, as well as sulfur and a vulcanization accelerator, with respect to 100 parts by mass of a rubber component, wherein
   the mass ratio of sulfur to said vulcanization accelerator is 1.0 to 2.3,
   the rubber cushion has a substantially triangular section and is used in the pneumatic tire between a tire carcass and end portions of a belt layer.

* * * * *